J. C. LIGHTHOUSE.
WHEEL AND TIRE.
APPLICATION FILED FEB. 7, 1908.

969,888.

Patented Sept. 13, 1910.

3 SHEETS—SHEET 1.

WITNESSES:
Clarence W. Carroll
L. Thow.

INVENTOR
John C. Lighthouse
by Offord & Davis
his attys

J. C. LIGHTHOUSE.
WHEEL AND TIRE.
APPLICATION FILED FEB. 7, 1908.

969,888.

Patented Sept. 13, 1910.

3 SHEETS—SHEET 2.

WITNESSES:
Clarence W. Carroll
L. Thon.

INVENTOR:
John C. Lighthouse
by Osgood & Davis
his Attys

J. C. LIGHTHOUSE.
WHEEL AND TIRE.
APPLICATION FILED FEB. 7, 1908.

969,888.

Patented Sept. 13, 1910
3 SHEETS—SHEET 3.

WITNESSES:
Clarence W. Carroll
L. Thon.

INVENTOR:
John C. Lighthouse

UNITED STATES PATENT OFFICE.

JOHN C. LIGHTHOUSE, OF ROCHESTER, NEW YORK.

WHEEL AND TIRE.

969,888.  Specification of Letters Patent.  Patented Sept. 13, 1910.

Application filed February 7, 1908. Serial No. 414,794.

*To all whom it may concern:*

Be it known that I, JOHN C. LIGHTHOUSE, a citizen of the United States, and resident of Rochester, in the county of Monroe and State of New York, have invented certain new and useful Improvements in Wheels and Tires, of which the following is a specification.

This invention relates to wheels and tires therefor.

The object of the invention is to provide a wheel and tire for vehicles which are capable of use on vehicles carrying heavy loads, and which have many of the advantages of the pneumatic tire without some of the disadvantages of the latter.

To this end the invention consists in the wheel hereinafter described, as the same is defined in the succeeding claims.

Figure 1:
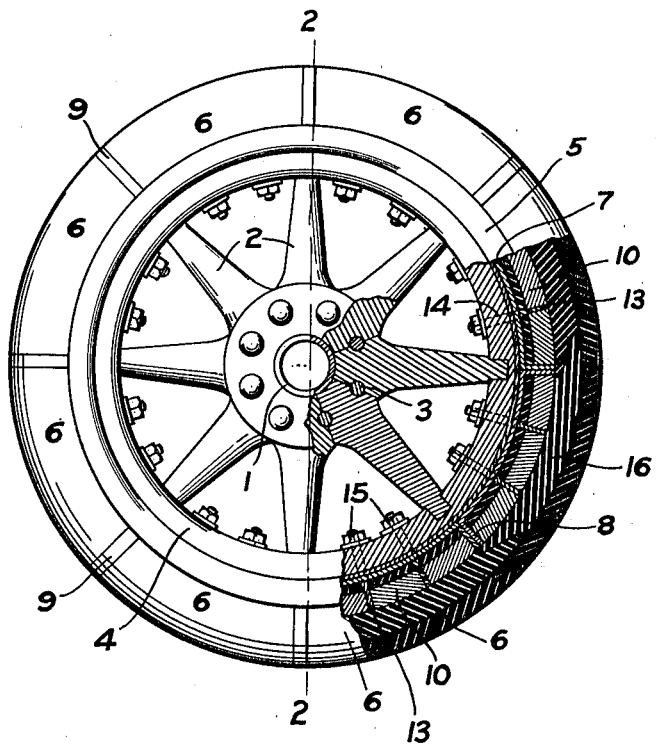
Figure 2:
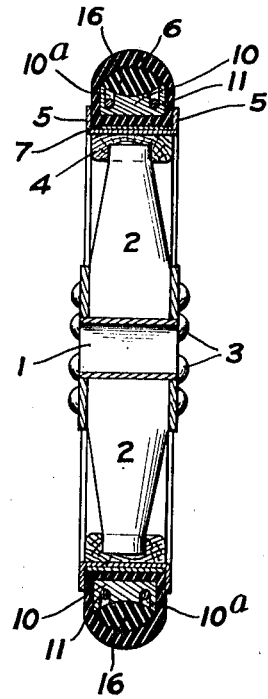
Figure 3:
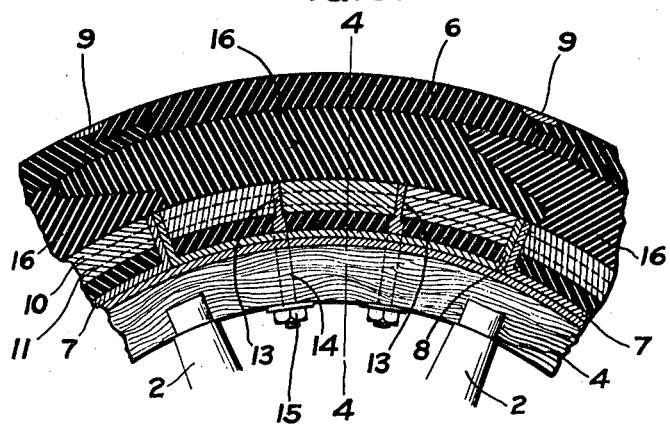
Figure 4:
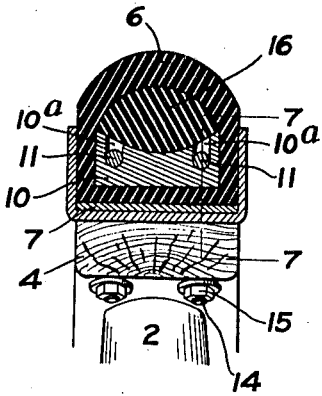
Figure 5:
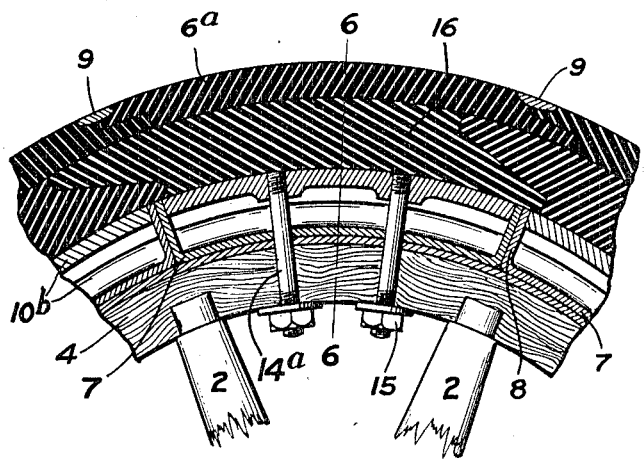
Figure 6:
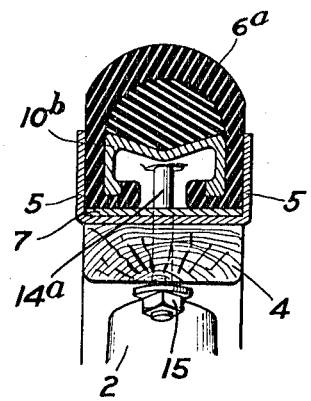
Figure 7:
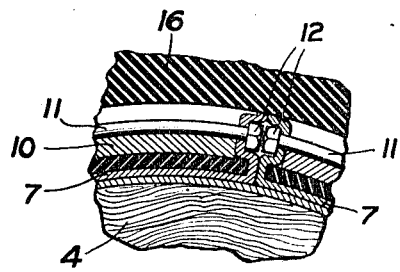
Figure 8:
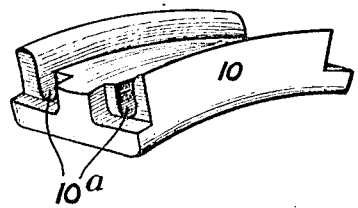
Figure 9:
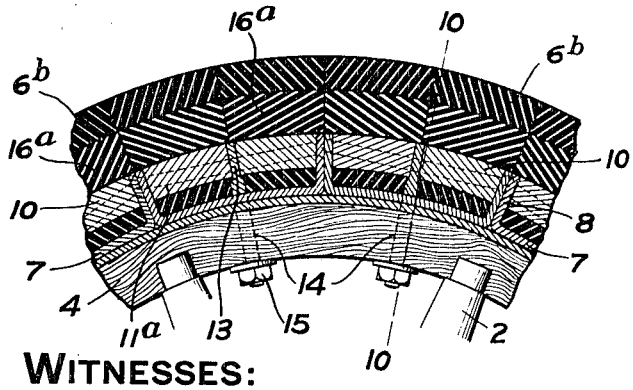
Figure 10:
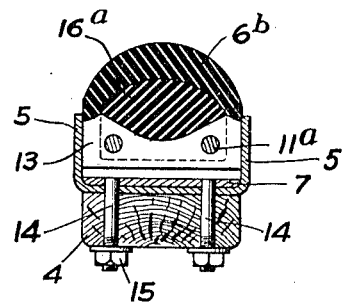
Figure 12:
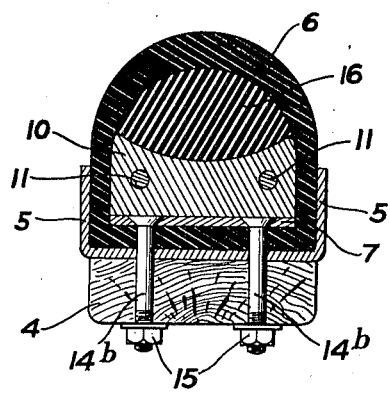
Figure 13:
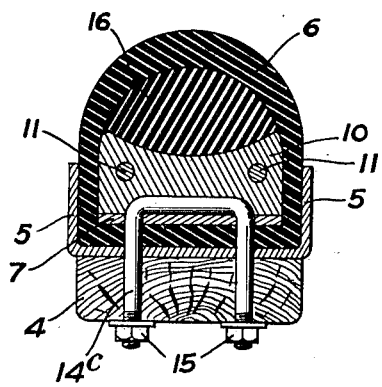
Figure 11:
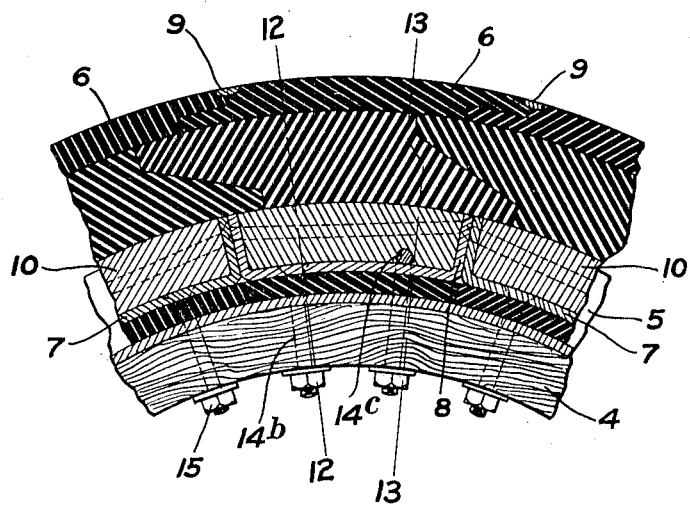

In the drawings: Figure 1 is an elevation and partly a vertical section of a wheel and tire embodying this invention; Fig. 2 is a cross section on the line 2—2 of Fig. 1; Fig. 3 is an enlarged vertical section through a portion of the same device; Fig. 4 is a cross section on the line 4—4 of Fig. 3; Fig. 5 is a vertical section through a modified form of the same device; Fig. 6 is a cross section on the line 6—6 of Fig. 5; Fig. 7 is a section on the line 7—7 of Fig. 4; Fig. 8 is a perspective view of a block employed in the device shown in Figs. 1, 2, 3, and 4; Fig. 9 is a vertical section of a modified form of the device; Fig. 10 is a cross section on the line 10—10 of Fig. 9; Fig. 11 is a vertical section of another modified form of the device; Fig. 12 is a cross section on the line 12—12 of Fig. 11; and Fig. 13 is a cross section on the line 13—13 of Fig. 11.

In Figs. 1 to 4, the wheel is shown as having a metal hub 1, spokes 2, fastened in the hub by bolts 3, and a rim 4 having side flanges 5, 5. The side flanges may be composed of metal while the rim 4 is of wood, and the flanges may be formed integral with each other, so as to form a channel having a bottom which fits upon the wooden rim 4, whereby the wooden rim is strengthened and is preserved from wear. The tire proper is composed of a series of abutting segments, of which in Fig. 1 eight are shown as making up the whole circle of the tire. Any number of segments more or less than eight may obviously be employed. Each segment, however, is independently removable and independently insertible, and the segments are made identical with each other, so that the tire is composed of a series of duplicate parts, and when any one part is injured, another segment or tire-section may be inserted in its place. Each section is composed of several parts. One of these parts is a rigid bottom holder which has its ends upturned so as to abut against the upturned end of the holder of the next section, and to assist in making the whole tire rigid and reducing the wear thereof. Lying in this holder and between the flanged sides 5 of the rim is an outer shoe composed of suitable material, such as fabric, for taking the principal wear in use. This shoe may be tubular in form, or it may be divided lengthwise and have its lower edges turned inward toward each other to form a partial bottom. Within this shoe is a block which may be of wood, metal, sheet metal, or other suitably rigid material, and which only partly fills the space inside the shoe. This block is preferably concave on its outer face or periphery, and the space thus left within the shoe is filled by a compressible and elastic filling piece. In use the filling is compressed and reduces the shocks produced by roughness of the roadway.

In Figs. 1 to 4, the outer shoe 6 of each of the tire sections or tire segments is a complete tube, which is set in the holder 7 and fits between the flanges 5. The ends of the shoe 6 fit against the upturned ends 8 of the holder, but along the portion outside of the flanges 5 the ends of the shoe 6 are rabbeted so as to match and overlap the ends of the shoes of the abutting sections or segments, and the joint is covered by a binding 9 to exclude dirt, moisture, etc., from the joint. Within the holder 7, and fitting within and against its upturned ends 8, is a block 10 having a concave outer face. The block is formed on a curve corresponding to that of the wheel, and said block (see Fig. 8) has two lengthwise grooves $10^a$ cut into its periphery to hold bolts or rods 11. These rods, as shown in Figs. 3 and 7, are curved to correspond with the curvature of the rim, and screw threaded on their ends and provided with nuts 12, resting in depressions in two of said end plates, as shown in Fig. 7. Or as shown in Fig. 3, the ends of the rods 11 rest in perforations through said end plates 8. There may be one or more blocks 10 for each section, and, therefore, for each holder 7. As shown in Fig. 3, there are three blocks 10 for each holder 7. As shown in Figs. 5 and 6, there is one block for each holder. As shown in Fig. 9, there are two blocks for each holder, and as shown in Figs. 11 and 12, there is one block for each holder.

In the form of device shown in Figs. 1 to 4, perforated plates 13 lie between the ends of the abutting blocks 10 within the holder, so that if there are three such blocks, there are two such plates. These plates pass through slots in the bottom of the shoe 6, and rest directly on the bottom of the holder 7, and are formed integral with stems or bolts 14, which pass through perforations in the rim and are fastened to the rim by means of nuts 15 on the inside of the rim. These plates, therefore, hold the block 10 from lateral movement, and also serve to hold the outer shoe 6 between the block 10 and the holder 7, and also to fasten the tire section or segment to the rim. The space between the block 10 and the shoe 6 is filled by a filling piece 16 of a compressible and elastic material, such as india rubber. The softness and compressibility of this filling piece may be adjusted, as desired, to the character of the work to be done by the vehicle. In vehicles that are to carry heavy loads the filling piece may be of suitably hard material and may have comparatively small compressibility, while with wheels to be used upon light vehicles, to carry light loads, the filling may be of the softest, india rubber, and the outer shoe may be made of the utmost flexibility also.

In Fig. 3 the filling piece is shown as having beveled, rabbeted ends, in order to match and overlap the ends of the filling pieces of adjacent or abutting segments or sections. This is the preferred form under some circumstances, just as the rabbeted and overlapping outer shoe 6 is the preferred form for some uses.

In Figs. 5 and 6, the holder 7 contains a single metal block $10^b$, which may be hollow to save weight; and the bolts $14^a$ are screwed into said block, and are held to the rim by nuts 15, as in the case of the first form described. In this form of the device, there is but one block for each holder 7. Inasmuch as the bolts $14^a$ are arranged in radial lines, they must be put through the rim and screwed into the block $10^b$. In other respects the device is the same as that shown in Figs. 1 to 4.

In Figs. 9 and 10, the holder or clamping device is of the same character as that shown in Fig. 3, consisting of the plate 13 and bolt 14 held to the rim by the nut 15, and there are only two blocks 10 and straight rods or bolts $11^a$ passing from end to end of the holder and through perforations in the plate 13. In this case also the filling $16^a$ and the outer shoe $6^b$ may be in as many parts as desired, and also (see Fig. 9) may have abutting ends without overlapping.

In Figs. 11, 12 and 13 the rods 11 are not held by the bolt, but pass through the block from end to end of the holder 7, while the holder itself is held to the rim by headed single bolts $14^b$, or, as shown, by U-shaped double bolts $14^c$.

It will be noted that in Fig. 6 the bottom of the outer shoe $6^a$ is discontinuous, and that the lower edges of the block $10^b$ rest upon inturned portions of the outer shoe, and with sufficient area of contact to hold the outer shoe firmly in the holder and to the rim.

What I claim is:—

1. A wheel having a rim and a tire consisting of a series of abutting segments, each attached to the rim and consisting of a bottom holder having upturned ends, an outer flexible shoe having its bottom part in said holder, a block in said shoe, means for retaining the shoe between the block and the holder, and a compressible filling between the top of the block and the shoe.

2. A wheel having a rim and a tire consisting of a series of segments, each attached to the rim and consisting of a bottom holder, an outer flexible shoe having its bottom in said holder and having end portions adapted to overlap the ends of adjacent shoes, a block in said shoe, a compressible filling between the top of the block and the shoe, and means for holding the block and shoe in the holder.

3. A wheel having a rim and a tire consisting of abutting segments, each attached to the rim and consisting of a bottom holder, an outer shoe having its bottom in said holder, a block in said shoe, a compressible filling piece between the top of the block and the holder and having end portions adapted to overlap the end portions of the filling of adjacent segments, and means for holding the shoe and block in the holder.

4. A wheel having a rim and a tire consisting of abutting segments, each attached to the rim and consisting of a bottom holder, an outer shoe having its bottom in said holder, and having end portions adapted to overlap the ends of adjacent shoes, a block in said shoe, a compressible filling piece between the top of the block and the holder and having end portions adapted to overlap the end portions of the filling of adjacent segments, and means for holding the shoe and block in the holder.

5. A wheel having a rim and a tire consisting of a series of abutting segments, each consisting of a bottom holder having upturned ends, an outer flexible shoe having its bottom part in said holder, a block in said shoe, one or more rods passing through the block and into the ends of the holder, a compressible filling between the top of the block and the shoe, and means for fastening the holder to the rim.

JOHN C. LIGHTHOUSE.

Witnesses:
HARRY L. BROWN,
D. GURNEE.